(12) United States Patent
Atkinson et al.

(10) Patent No.: US 6,507,726 B1
(45) Date of Patent: Jan. 14, 2003

(54) COMPUTER IMPLEMENTED EDUCATION SYSTEM

(75) Inventors: Mark Atkinson, New York, NY (US);
Mike Skorski, Waldwick, NJ (US);
Roy Pea, Menlo Park, CA (US);
Michael Sands, Sunnyvale, CA (US);
Jeff Glasse, New York, NY (US);
Jonathan Spaihts, New York, NY (US)

(73) Assignee: Educational Standards and Certifications, Inc., New York, NY (US)

( * ) Notice: Subject to any disclaimer, the term of this patent is extended or adjusted under 35 U.S.C. 154(b) by 0 days.

(21) Appl. No.: 09/609,204

(22) Filed: Jun. 30, 2000

(51) Int. Cl.[7] ............................. G09B 5/04; G06F 17/60
(52) U.S. Cl. .................... 434/350; 707/512; 434/307 R
(58) Field of Search ................................. 434/350, 322, 434/323, 307 R, 219, 262, 362; 707/500, 512

(56) References Cited

U.S. PATENT DOCUMENTS

| | | | | |
|---|---|---|---|---|
| 5,310,349 A | * | 5/1994 | Daniels et al. ............... | 434/350 |
| 5,583,980 A | * | 12/1996 | Anderson ................... | 345/473 |
| 5,791,907 A | * | 8/1998 | Ramshaw et al. ........... | 434/262 |
| 5,806,079 A | * | 9/1998 | Rivette et al. ............... | 707/512 |
| 5,823,781 A | * | 10/1998 | Hitchcock et al. .......... | 434/118 |
| 5,838,313 A | * | 11/1998 | Hou et al. ................ | 707/500.1 |
| 5,978,648 A | * | 11/1999 | George et al. ............... | 434/362 |
| 6,029,043 A | * | 2/2000 | Ho et al. ..................... | 434/350 |
| 6,091,930 A | * | 7/2000 | Mortimer et al. ........... | 434/362 |
| 6,155,840 A | * | 12/2000 | Sallette ....................... | 434/323 |
| 6,157,808 A | * | 12/2000 | Hollingsworth ............ | 434/350 |
| 6,160,987 A | * | 12/2000 | Ho et al. ..................... | 434/350 |
| 6,211,868 B1 | * | 3/2001 | Lin et al. ..................... | 345/302 |
| 6,213,780 B1 | * | 3/2001 | Ho et al. ..................... | 434/219 |
| 6,212,358 B1 | * | 4/2001 | Ho et al. ..................... | 434/362 |
| 2002/0059342 A1 | * | 5/2002 | Gupta et al. ................ | 707/512 |

* cited by examiner

*Primary Examiner*—Joe H. Cheng
*Assistant Examiner*—Kathleen M Christman
(74) *Attorney, Agent, or Firm*—James V. Mahon; Clifford Chance US LLP

(57) ABSTRACT

A curriculum scheduling method includes receiving input data identifying target subject matter, processing the input data to determine an educational standard associated with the target subject matter, querying a database to determine curricula that supports (i.e., contains lessons relevant to) the educational standard, receiving from the user a selection of at least one curricula item from among the determined curricula, and allocated time periods for participation in presentation of the selected curricula item(s). The educational standard may include a group of requirements and the database may be queried based on a requirements selected by the user. A computer-based method of displaying curricula also may include receiving curricula data that includes a sequence of presentation segments and segment marker data, processing the segment marker data to determine information context associated with the presentation segments, and coordinating a display of other curricula data with a display of the presentation segments based on the determined information context. The ordering of the presentation segments may be changed based on a user's comprehension of curricula. The method can also include displaying an interface that includes, e.g., images representing chat rooms associated with particular presentations segments. By selecting one of the images, a user's terminal can be connected to a chat room messaging database to enable chat message exchange. Other method and systems are further disclosed herein.

4 Claims, 11 Drawing Sheets

200

We can help you create learning maps and provide you with personalized recommendations based on your profile. The better you keep it updated, the better we can serve you. All information is kept completely confidential; we do not give or sell information to anyone.

Name: Judy Smith
Address Line 1 (or organization): Galapagos High School
Address Line 2 (optional): 333 Oak Way
City: Yourtown
State: CA
Country: USA
ZIP Code: 98999
Phone: 123-456-7890
Email: judysmith@yahoo.com
Occupation: Elementary Teacher
Discipline: Science
Pedagogy: All

[Update Profile]

Preferences
☑ receive monthly newsletter

COMPUTER IMPLEMENTED EDUCATION SYSTEM

BACKGROUND OF THE INVENTION

Computerized education systems can be used to provide instructional content including interactive lessons, stored video, text-based resources, and other information to students. Such systems can be used to offer degree programs and courses at times and in locations convenient to students, thus minimizing constraints associated with campus based education providers.

SUMMARY OF THE INVENTION

A networked-accessible computer-based educational system can offer curricula such as lessons, demos, and interactive materials to a large number of students. In such a system, data can be shared with multiple users. This allows efficient distribution of materials and also allows the system to support user communities. User communities can be groupings of users that share, e.g., common interest and educational goals, are members of the same school district or geographic region, or have other traits of interest within the virtual communities that they and other users establish. In some implementations, communities of users can be identified by using a software filter that allows a user to identify other users based on entered parameters.

Individual users and user communities can contribute "collateral" curricula materials to the "primary" curricula available on the system. This collateral material can include comments, ratings, explanations, and other feedback on the primary curricula. The collateral curricula may be automatically integrated with the primary curricula. In addition, users can exchange ideas one-on-one with other specific users (e.g., as privately exchanged messages and data) or with all users or with particular communities of users (e.g., using electronic bulletin boards and chat rooms). Implementations may include some or all of the inventive aspects described herein and different aspects of the invention can be grouped together and customized by an implementation.

In general, in one aspect, the invention features a computer-implemented curriculum scheduling method. The method includes receiving data at a computer that can be used to assess an educational skill level of a user. The computer can processing the data to determine a skill level for the user and then, based on the skill level, query a database to determine an initial schedule of curricula appropriate for the user. Implementations may include one or more of the following features. Data identifying an educational goal can also be received and used to query the database. After determining the initial schedule, curricula can be presented to the user and then data can be exchanged to assess skill development. The initial schedule can be modified based on the user's skill development.

In general, in another aspect, the invention features a computer-implemented curriculum scheduling method that includes receiving input data identifying target subject matter, processing the input data to determine an educational standard associated with the target subject matter, querying a database to determine curricula that supports (i.e., contains lessons relevant to) the educational standard, receiving from the user a selection of at least one curricula item from among the determined curricula, and allocated time periods for participation in presentation of the selected curricula item(s). The educational standard may include a group of requirements and the database may be queried based on a requirement selected by the user.

In general, in another aspect, the invention features a computer-based method of displaying curricula. The method includes receiving curricula data that includes a sequence of presentation segments and segment marker data, processing the segment marker data to determine information context associated with the presentation segments, and coordinating a display of other curricula data with a display of the presentation segments based on the determined information context. The ordering of the presentation segments may be changed based on a user's comprehension of curricula. The method can also include displaying an interface that includes, e.g., images representing chat rooms associated with particular presentations segments. By selecting one of the images, a user's terminal can be connected to a chat room messaging database to enable chat message exchange.

In general, in another aspect, the invention features a method of displaying curricula that includes sequentially displaying curricula segments and annotating the curricula segments with annotation data received from a user. The received annotation data can then be stored in a database along with data associating each item of annotation data with one of the curricula segments.

Implementations may include one or more of the following features. In some cases, the annotation data may be responses to an assessment or quiz and, after receipt, the annotation data may be sent to a grading system. Other types of annotation data may be integrated with the curricula such that, on subsequent displays of the curricula segments, the annotation data (or indications that annotation data exist) are displayed along with the annotated segments.

The details of one or more embodiments of the invention are set forth in the accompanying drawings and the description below. Other features, objects, and advantages of the invention will be apparent from the description and drawings, and from the claims.

DESCRIPTION OF THE DRAWINGS

Figure 5:
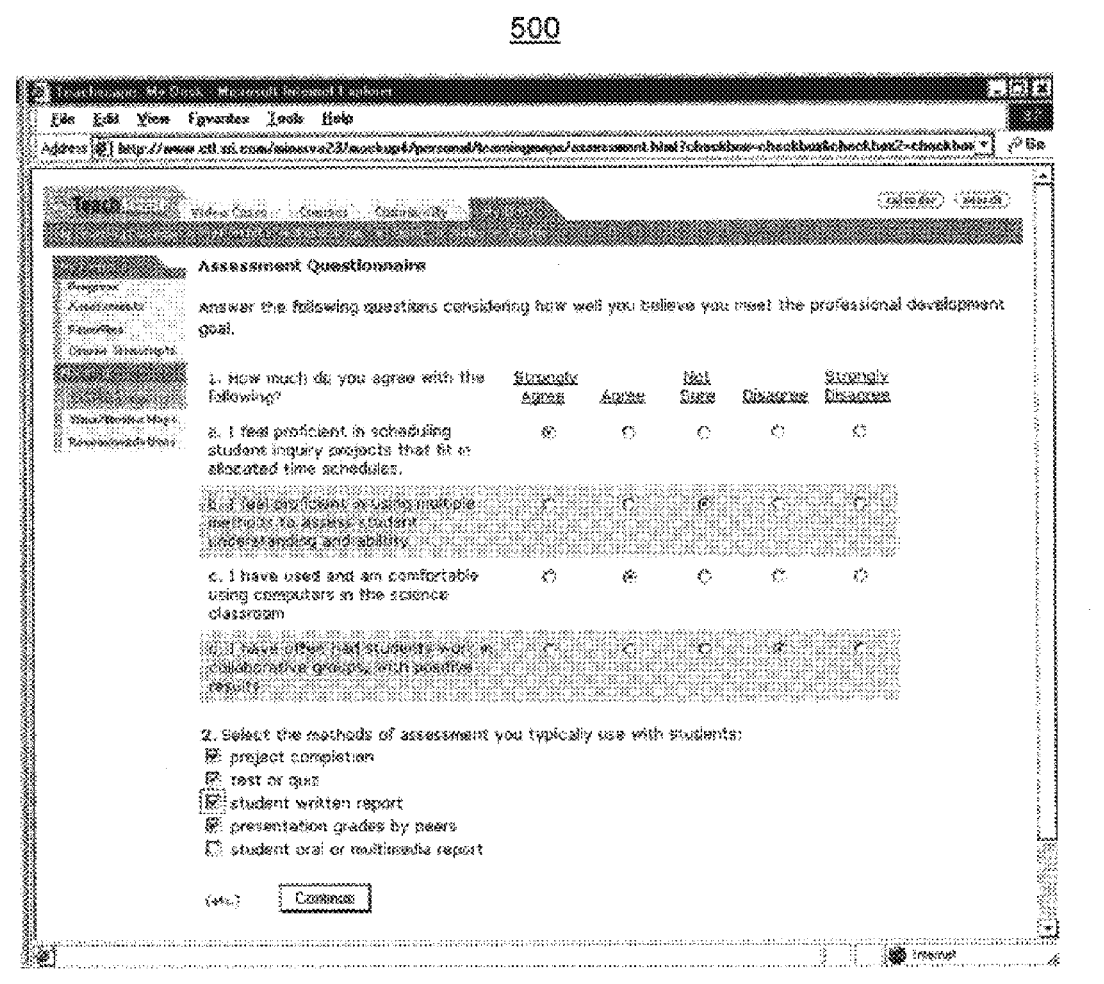

FIGS. 2–7 are data input form displayed at a web browser and enabling posting of entered data to a host computer system.

FIG. 8 is a list including learning map data.

DETAILED DESCRIPTION OF THE INVENTION

A computerized learning system can provide a great deal of flexibility in choice, format, and scheduling of curricula. In some system implementations, curricula can be presented, and learning reinforced, using a number of different audio-visual resources. These audiovisual resources can include primary curricula material, such as stored video and audio, that is presented to a user via a computer terminal. The primary curricula material may be reinforced by associated collateral material. The collateral material can include, e.g., displayed text, animations, links to resource materials, assessment tools, and data derived from interactions between participants and the system (i.e., "participant interaction data"). Participant interaction data may include comments exchanged using computerized chat rooms, messaging forums, e-mail, and curricula annotation tools. Assessment tools (such as on-line quizzes, self-assessment forms, and pop-up question boxes) can be used to assess a participant's understanding of curricula. In some implementations, a computerized learning system may dynamically alter curricula presentations based on an assessment.

Appropriately selecting from among offered curricula is necessary to help satisfy educational standards, personal goals, time constrains, and other criteria. Selecting and scheduling curricula may be complex when different curricula offerings include overlapping subject matter that may fulfill a common interest, goal, or educational standard. Avoiding unintended repetition of subject matter can help participants more effectively use available learning time and resources. Scheduling complexities also arise when combinations of curricula are necessary to fulfill a single interest, goal, or educational standard. Advantages can be obtained by assisting students in effectively combining curricula to meet such interest, goals, and standards. Consequently, improvements in assisted scheduling of curricula are desired.

Assisted curricula scheduling and functionality to combine presentations and of primary curricula material together with access to collateral materials can be implemented in both stand-alone and network-based computerized education systems. In the description that follows, a network-based computerized educational system including both assisted scheduling features and functionality to combined presentations of primary with access to collateral materials is described. However, implementations of the invention may include a subset of the described features (e.g., scheduling-only, primary and collateral presentations only, or sub-combinations thereof). Implementations of the invention can also embodied in stand-along (i.e., non-networked) systems using locally accessed data or data stored at, e.g., a proxy server or cache server.

Figure 1:
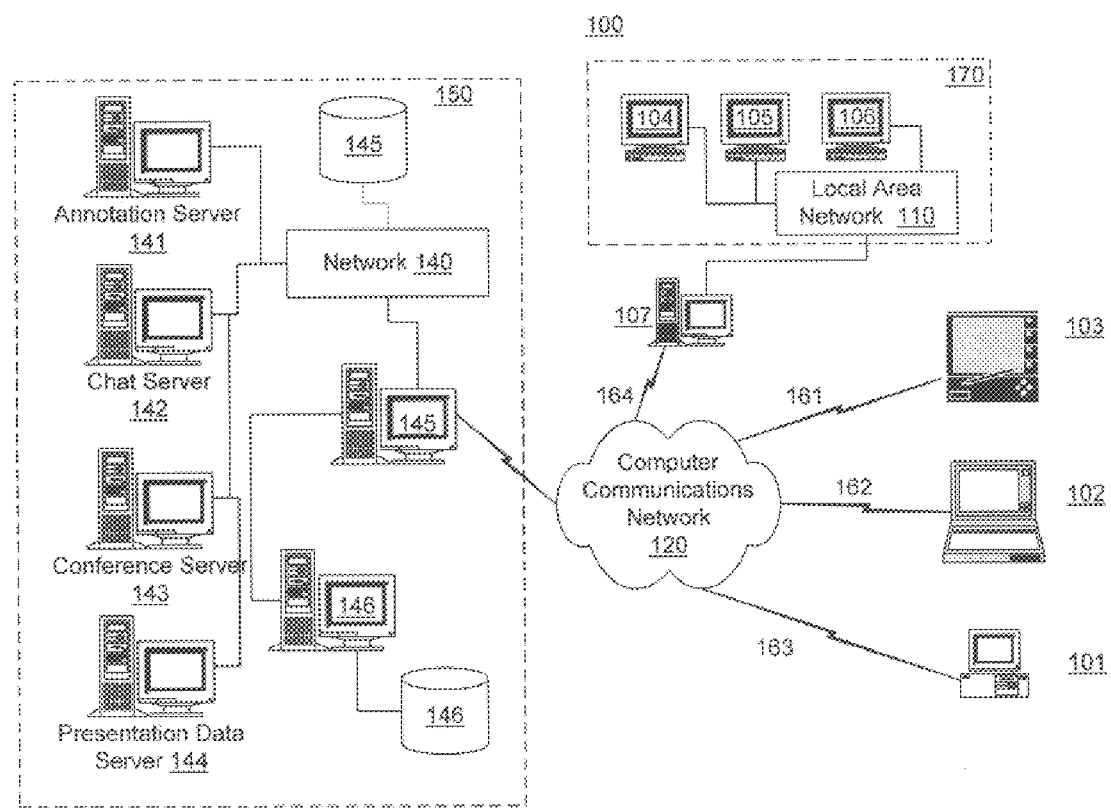
FIG. 1 is a computer communication network.
Figure 3:
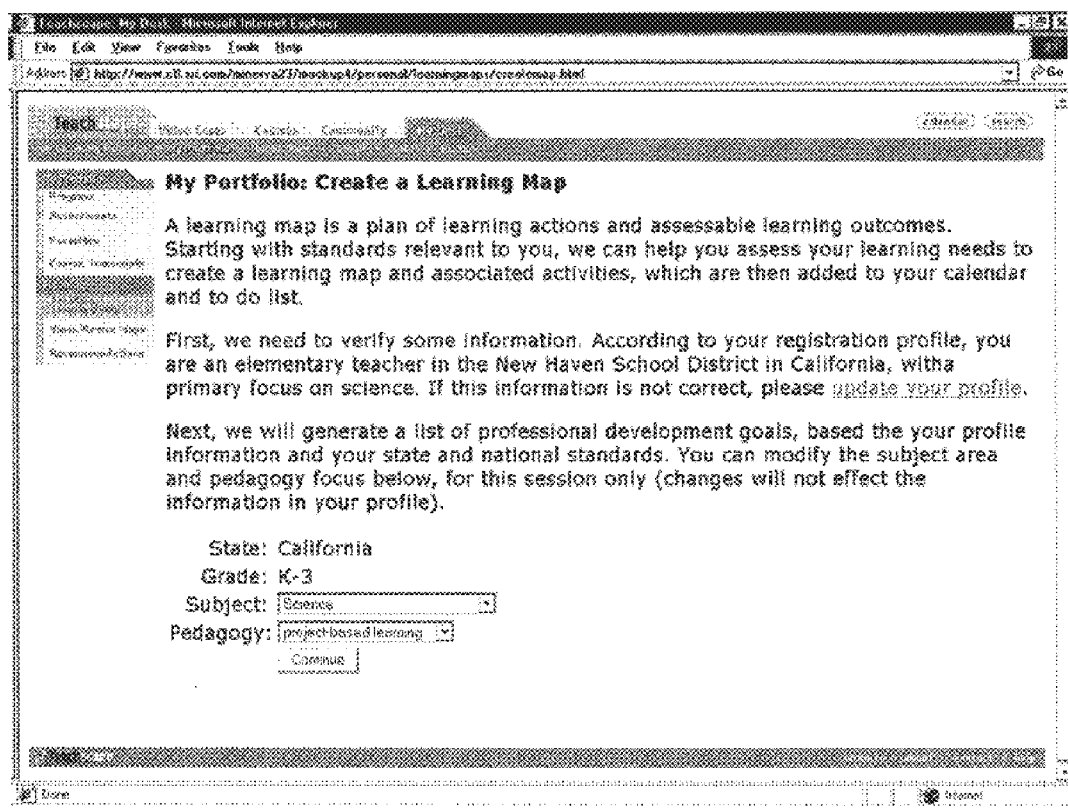
Figure 4:
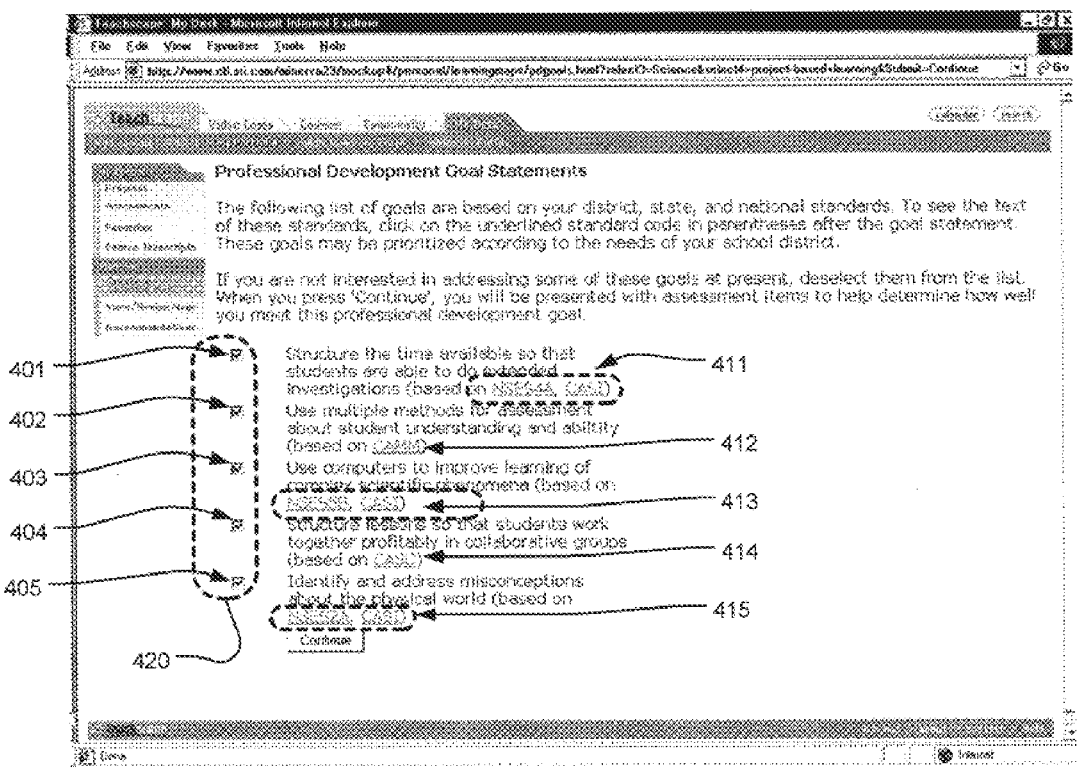
Figure 6:
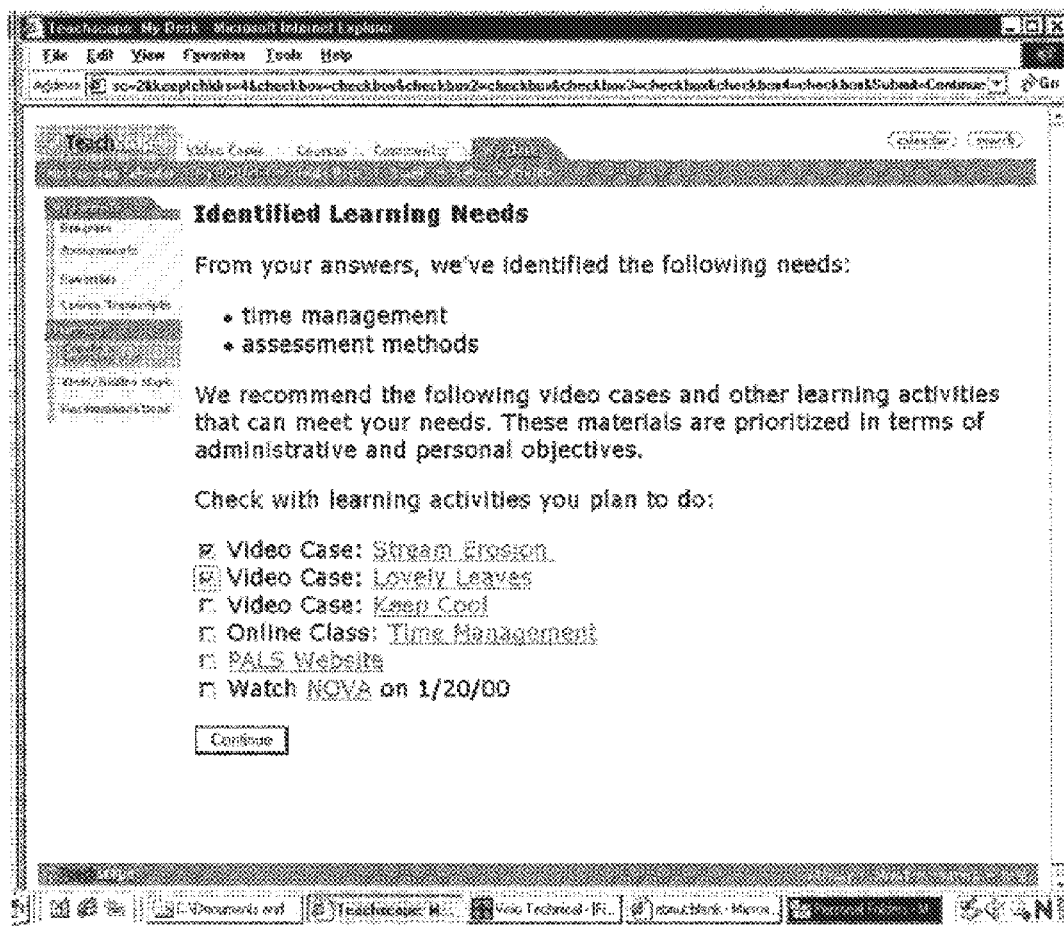
Figure 7:
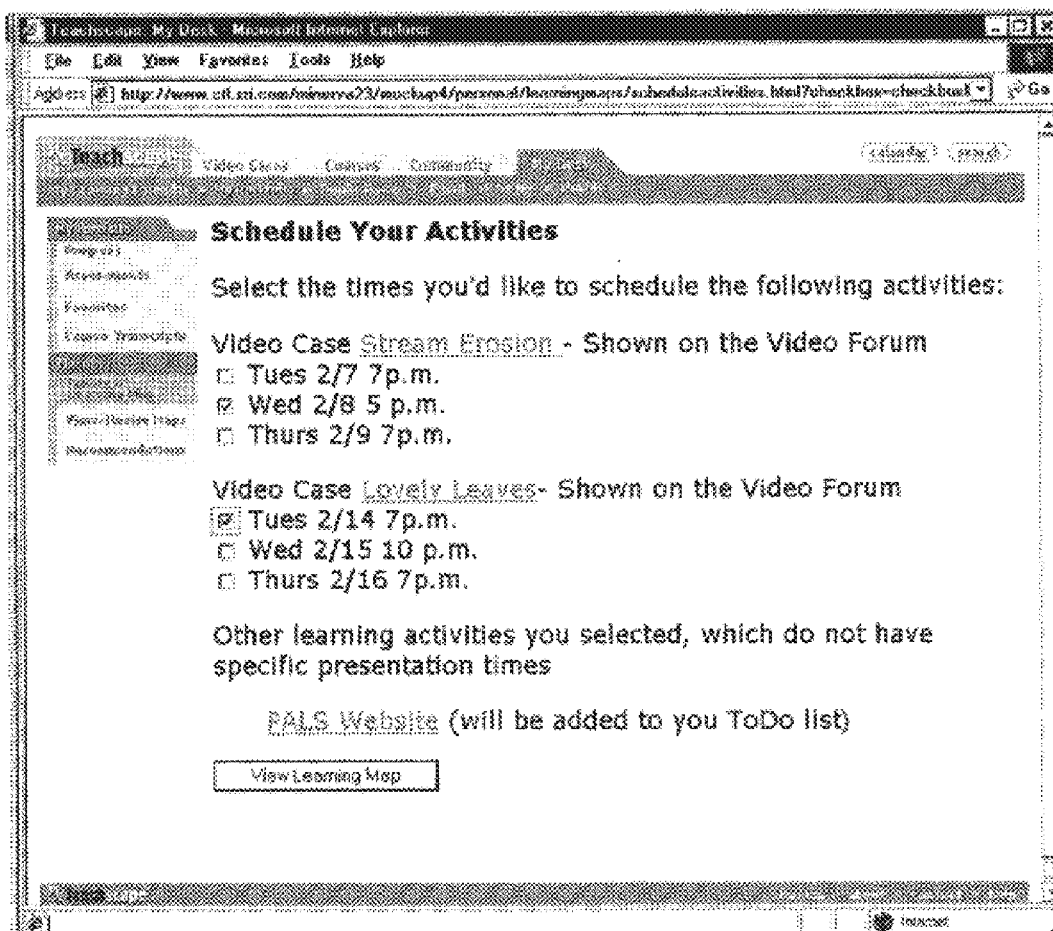

FIG. 1 is a diagram of a computer network 100. The network 100 includes a host system 150 that is used to provide on-line educational materials to participants (i.e., students) at client computers 101–106. The host system 150 includes one or more databases 145 storing primary presentation data and one or more databases 146 storing collateral material data. The primary presentation data may include audio and video data used to present curricula, and the collateral material data is used to present other materials associated with the presented curricula. The primary presentation data as well as the collateral material data may processed, stored, and manipulated by one or more servers 141–146. Data in the database 145 and 146 data may include stored text, audio, video, graphics, animations, illustrations, data received from participants, and other types of data described herein. We note that may different database architectures may be used and the database descriptions herein are to be considered exemplary.

The host system 150 can be accessed over a network 120 by client computers 101–106. In general, each of the client computers includes a processor, memory, a network interface device (such as a modem, digital subscriber line, or local area network interface), a user input device (such as a keyboard and mouse) and a user output device (such as a video display and/or printer). The client computers 101–106 can directly or indirectly communicate with the host system 150 to obtain data stored at the host 150. Indirect communication can include communication through a proxy server or a local caching server. For example, a caching server 107 can store frequently accessed data, or may replicate primary or collateral curricula data from the host 150 so as to improve access speed for connected clients 104–106. The client computers can access the host 150 using conventional web browser software and/or other access software. The web browser software may include a generic hypertext markup language (HTML) browser, such as Netscape Navigator 4.0 or Microsoft Internet Explorer 5.0, as well as plug-in applications. The client software also can be proprietary software. In some cases, an executable program, such as a Java™ program, may be downloaded from the host 150 to the client computer and executed at the client computer as part of a host 150 access system.

The host system 150 can be used for a wide variety of educational purposes including course scheduling and education of students in grade school, high school, colleges, corporations, continuing education classes, employee training, etc. In the example implementation that follows, the system 150 is used to help teachers develop their teaching skills and subject matter knowledge. Assistance is provided to help ensure that the developed skills meet applicable federal, state, regional, and district teaching standards To help teachers develop their teaching skills and subject matter knowledge, the system 150 can provide guidance, planning, and instructional material in the form of primary curricula and collateral material to educate teachers about particular course work that they, in turn, may teach their students. This guidance, planning, and instruction may emphasize course work explaining methods and concepts conforming to federal, state, regional, and district educational standards. The system 150 can adapt the curricula, guidance, planning, and instruction given to particular teachers depending on, e.g., their experience, goals, personal schedules, and applicable teaching standards. This personalization may be presented in the form of learning maps that are individualized (i.e., customized) for particular persons, departments, groups, or schools. A learning map sets forth an individualized scheduled plan for participation in curricula offerings and other learning activities.

The system 150 can form a learning map using data about a particular participant ("user profile data"). This user profile data can be dynamically obtained from participants using on-line forms. In a browser-based implementation, these forms may be formatted using the hypertext markup language (HTML) and exchanged with the host system 150 using the hypertext transfer protocol (HTTP). User profile data also can consist, in whole or in part, of previously stored data. Previously stored data can include all forms of data accessible by the host system 150 including data stored at the host 150, at client computers (e.g., in the form of data files, database records, or browser "cookies"), and data stored at other network 100 systems. Consequently, a database of user profile data can include data stored at the host 150, at client computers 101–106, and/or distributed throughout the network 100.

User profile data can be collected at different times and using different collection processes. For example, user profile data can include general user data collected when a participant's account is established (e.g., user name and address data). This general user data can be supplemented by data collected as services are provided by the host 150. Data collected in forming a learning map can be added to the general user data and stored in the user profile. FIGS. 2–7 show on-line forms that may be used to collect user profile data. Form 200 (FIG. 2) is used to enter general user profile data (including, among other things, a participant's name and address). The form 200 can also be used to enter a subject matter discipline. Data required by form 200 may be entered during establishment of a participant's account on the system 150.

Data also may be collected as particular services are accessed by a participant. When a participant request a learning map (e.g., by clicking on a designated hyperlink, selecting from a menu item, or via other interface control mechanisms), the form 300 (FIG. 3) may be used to collect any supplementary data needed by the host 150. If particular data items are already in a user's data profile (e.g., the "State" and "Grade" information collected via form 200), the corresponding fields on a form (e.g., form 300) can be displayed pre-filled with values from the user's data profile. In some implementations, these pre-filled values may be read-only, while in other implementations a user may, in the course of accessing a particular host 150 service, temporarily override or permanently replace these previously submitted values.

To form a teacher's learning map, the system 150 determines applicable educational standards (and/or goal statements) using the user profile data (which may include the temporarily stored data). This determination may be performed by querying a database 145 of educational standards. The educational standards database may be indexed using a variety of required and optional parameters. In forming a database query, data from a participant's user profile can be used to fill in query parameter values. For example, the system may query an educational standards database using parameters from forms 200 and 300 that identify subject matter (e.g., "Science"), locality (e.g., "California"), and grade level (e.g., "K–3") to determine, e.g., California state teaching standards for science curricula in the kindergarten through third grade.

Educational goal statements may be determined instead of, or derived from, the educational standards. Goal statements may be phrased in terms of standards-related concepts or may include a hyperlink or other identifier 411–415 to related educational standards. Screen 400 (FIG. 4) shows a standards database query result phrased in terms of a set of professional development goal statements 401–405. Each goal statement may include one or more hyperlinks 411–415 to educational standards related to the goal. A participant may decide that only a subset of the displayed goals are of interest. After reviewing the goals and/or requirements, a user may decide that, when forming his or her learning map, some goals and requirements have a greater emphasis than others. The system 150 may allow user-prioritization of goals and standards using selection check boxes, ordered lists, priority values, or other interface controls. For example, on form 400, a user can select or deselect check boxes 420 to emphasize particular goals.

The goals and standards (e.g., 401–405), prioritization data (e.g., from inputs 420), and/or other user profile data can be processed by the system 150 to identify a participant's particular learning needs and to recommend curricula for that participant. In some implementations, learning needs and recommended curricula may be further customized based on an individual's particular strength's and weaknesses. The system 150 may include assessment tools to identify such strengths and weaknesses. Assessment tools can include on-line testing as well as self-assessment. Form 500 (FIG. 5) is an example of a form that can be used to collect self-assessment data. Assessment data (alone and in combination with the determined goals and standards, prioritization data, and other user profile data) can be used to identify a set of individualized learning needs 610 (FIG. 6) and recommended learning activities (i.e., curricula). This identification can be performed by querying a database 145 relating learning needs and learning activities to assessment parameters, prioritized goals, standards, and other user profile data.

Figure 8:
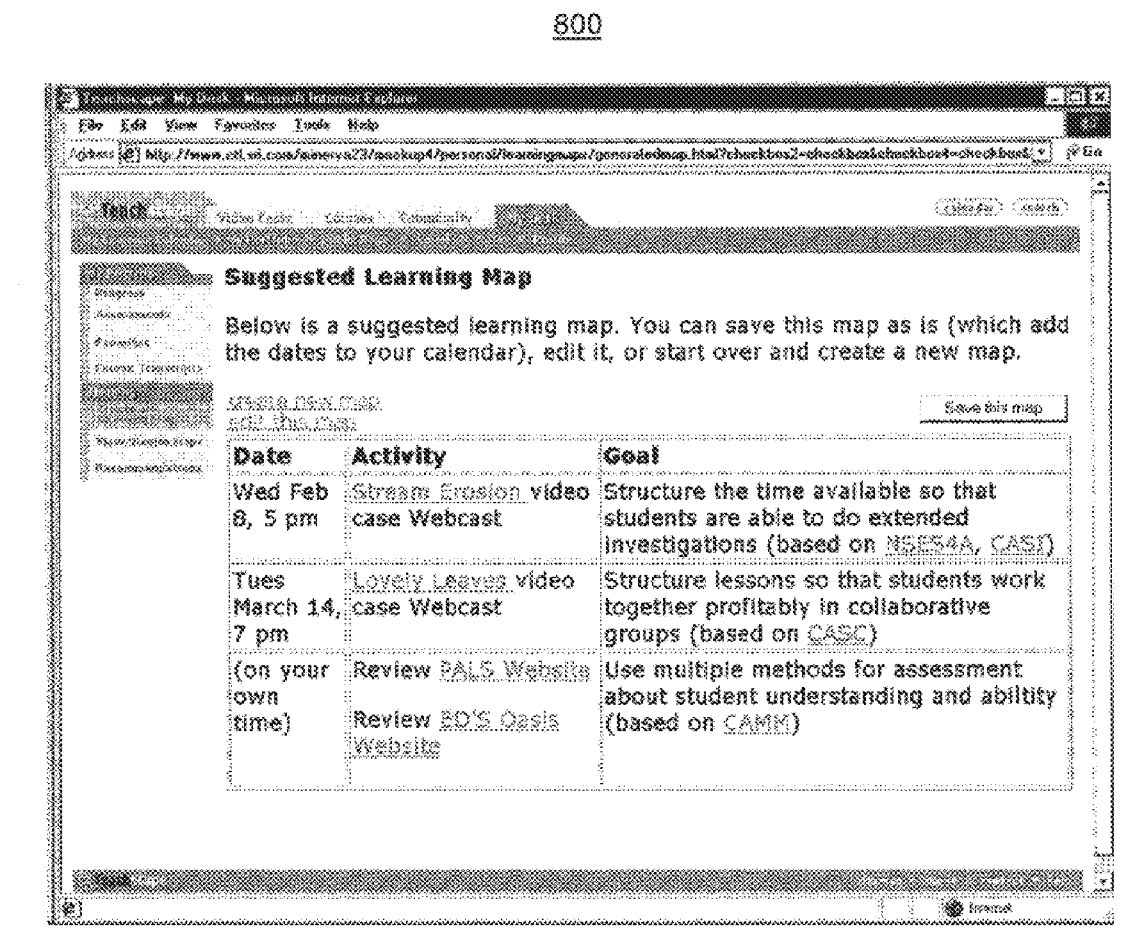
Figure 9:
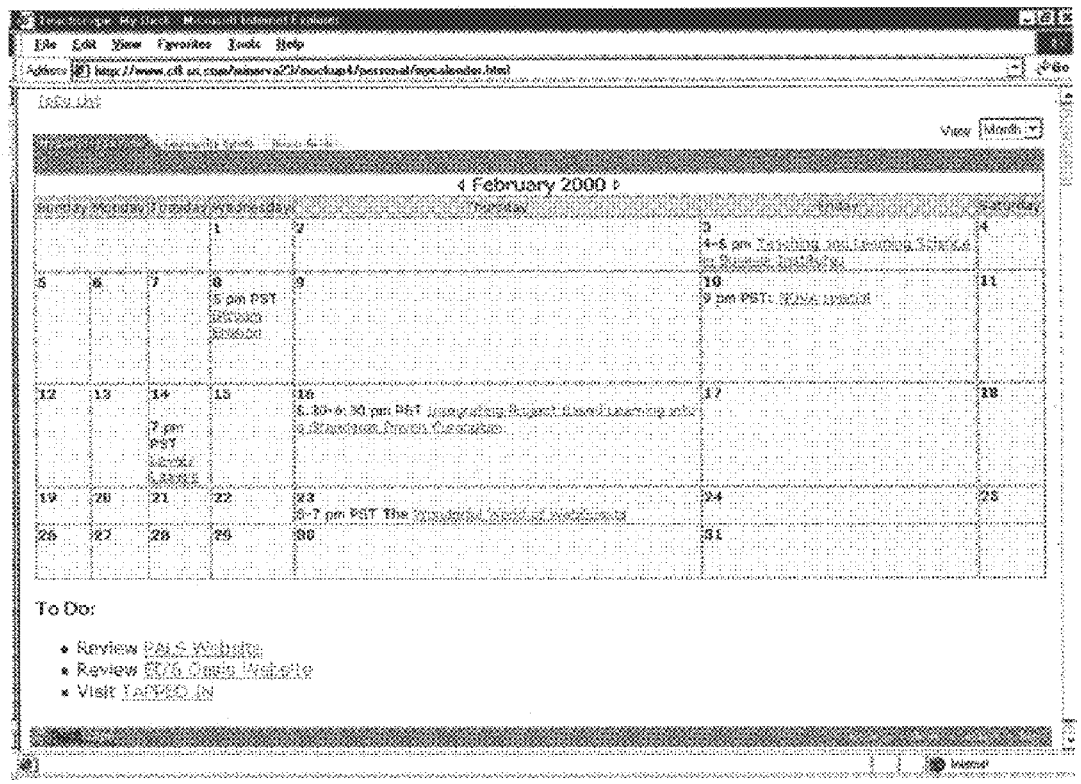
FIG. 9 is a calendar including learning map data.

After learning needs and suggested curricula are presented to a user, the user can further refine contents of their learning map by prioritizing particular curricula of interest (i.e., via check boxes 630). If particular curricula is available at different times, the system 150 may allow user to select a preferred time (form 700 of FIG. 7). The system 150 will then display a learning map 800 (FIG. 8). The learning map 800 includes curricula scheduled in accordance with the collected data from forms 200–700. A learning map may be displayed in various forms (e.g., in a list 800 or as a calendar 900 (FIG. 9)).

Curricula scheduled on a learning map 800, 900 may be available from a variety of sources such as educational television programs and on-line sources. Curricula may also be provided using data distribution and presentation features of the host system 150. Curricula provided by the system 150 can include both primary curricula material, and collateral curricula information. Primary and collateral curricula materials can be combined to teach and reinforce a common educational concept. In general, primary and collateral materials are derived from separate sources. In the example that follows, the primary curricula is a classroom lecture stored in video form in a host system database. This stored video includes inherently related audio and video components. The system 150 also includes collateral curricula that relates to, and reinforces, this stored video presentation, but is not an inherent part of the video presentation. That is, the collateral curricula is not an inherent part of the primary curricula's presentation. The collateral curricula includes explanatory text, course notes, links to reference materials, participant chat rooms, e-mail, and message posting forums.

Primary and collateral curricula materials may each include a number of logically separate segments. Each logical segment may teach or refer to a different part of a broader concept. For example, a primary curricula video presentation about stream erosion may consist of there logical segments: (i) stream formation, (ii) effects of stream erosion on earth surface features, and (iii) scientific modeling of streams. Each of these logically separate segments is referred to, herein, as having a different "information context." In general, curricula segments that differ in "information context" address different aspects of a subject matter area. Curricula materials also may be segmented in other ways. For example a video may be segmented by time (e.g., into five minute intervals).

Figure 10:
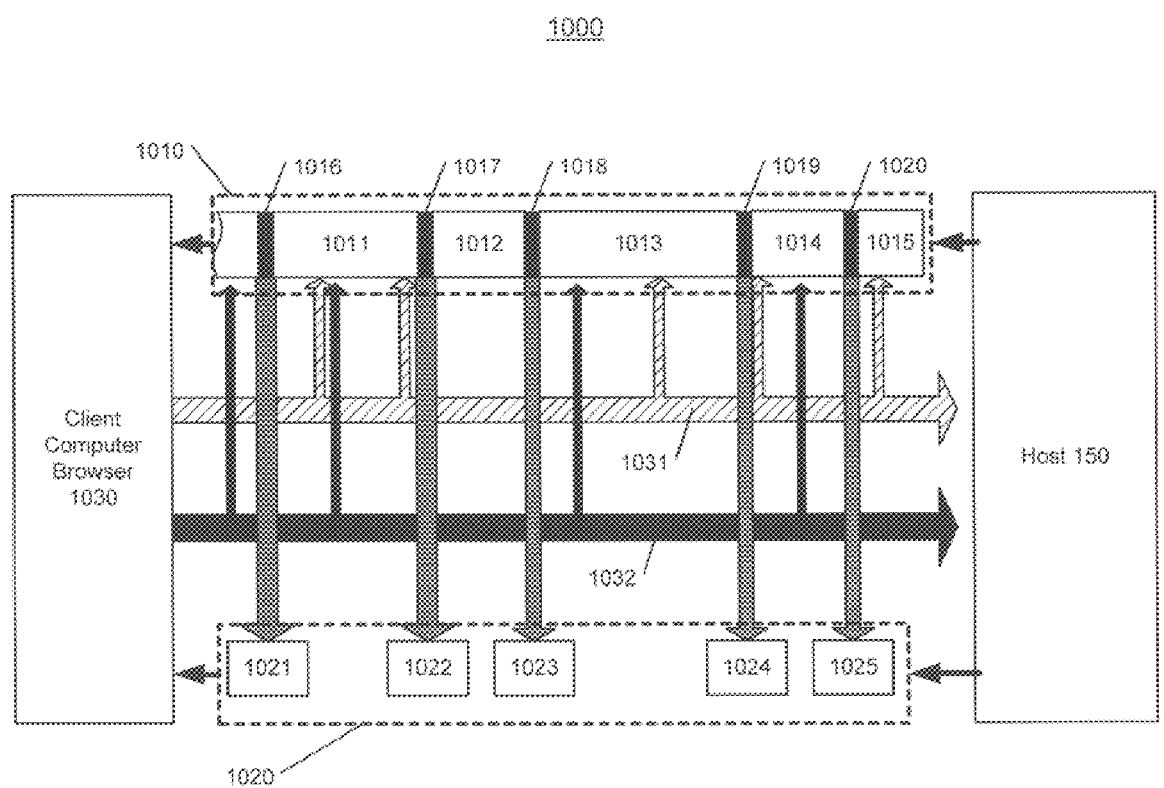
FIG. 10 is a data diagram.

The system 150 can associate primary curricula segments with collateral curricula segments. Associations between primary curricula segments and collateral curricula segments can reinforce learning by helping users determine the collateral material that is matched with different concepts taught by the primary curricula. Associations between primary curricula and collateral curricula can be tracked by the host 150 and/or by software at the clients 101–106 using marker data. Marker data delimits segments of primary and collateral curricula presentation data and enables referencing of the different segments. FIG. 10 is a data diagram showing data transmitted between the host system 150 and a browser 1030 at a client computer (i.e., one of clients 101–106). In this example, the data transmitted from the host to the browser includes segments 1011–1015 of primary curricula data 1010 and segments 1021–1025 of collateral curricula data 1020. The primary curricula data also includes embedded marker data 1016–1020. Different types of data 1031–1032 can be transmitted from the browser to the host. In this example, data 1031 is data requesting access to collateral data. Data 1032 can include user inputs manipulating collateral data, such as by requesting creation or storage of new collateral data or alteration of existing collateral data. Data 1031 may be in the form of data representing mouse clicks, menu selections, keyboard inputs, and other browser inputs.

The collateral curricula data 1021–0325 (which can include detailed text explanations, links to reference materials, chat rooms, messaging forums, participant annotations, and assessment tools) can be associated with particular segments 1011–1015 of the primary curricula. The system 150 can control and coordinate presentation of, and access to, the collateral curricula based on the information context of the primary curricula. The information context of each segment of primary curricula may be indicated, implicitly or explicitly, by the marker data 1016–1020.

Coordination of transmission and/or reception of primary and collateral materials can be accomplished via marker data 1016–1020 (which, in this example, is embedded within the primary curricula data). Embedded marker data can include encoded data headers, data pointers, disk track and segment information, or other coded information delimiting the segments 1011–1015 from each other. Marker data can also be implemented using non-embedded data (such as time stamps, byte offsets and other types of counters) to identify segments of the primary curricula data 1010. As the host system 150 reads primary curricula data from a database 145, the host system 150 may use the marker data to identify start and end-points of segments 1011–1015 of the primary curricula data. The host system 150 can synchronize the transmission of primary 1010 and collateral 1020 data based the identification of the segments 1011–1015. For example, as segments 1011–1015 are being retrieved from database 145 and transmitted to client computers 101–106, marker data 1016–1020 read by the host 150 can be used to coordinate the retrieval of collateral data 1021–1025 from a database 146 and transmission of that collateral data to client computers. Primary curricula segments 1011–1015 and associated collateral data 1021–1025 can be transmitted over network 120 so that availability of the collateral data 1021–1025 is timed to the presentation of the primary curricula segments 1011–1015.

In some implementations, the marker data can be sent directly to the client computers 101–106 and software at the client computers can use that marker data to control the receipt of collateral data 1021–1025 from the host 150. The marker data can be, e.g., pointers or hypertext links that are extracted from the primary data 1010 by client computer software and displayed (e.g., as text or graphics with associated hypertext links) to a participant for selection. In some cases, such hypertext links may be automatically activated by the browser to retrieve collateral data.

In a video-based implementation, the host system 150 may send marker data 1016–1020 along with streamed video data from a streaming media server 144. The streamed video data may be processed and presented to a user as primary curricula using, e.g., an Apple QuickTime, Real Networks RealPlayer, or Microsoft Windows Media Player software. The client computers 101–106 can extract the marker data using a web browser or media player plug-in. The marker data can include hypertext links that are automatically activated by the client computer's browser to request an appropriate section of collateral data 1021–1025 from the host 150. The client computers can then retrieve the needed collateral data 1021–1025. Depending on the type of collateral and marker data, this retrieval may be synchronous with the presentation of the primary curricula, or may occur at a later time (e.g., hypertext links in the marker data can be added to a list of reference links and the associated material can be retrieved after presentation of the segments 1011–1015).

Collateral data 1021–1025 can be used to implement various participant interaction features through the exchange of participant interaction data. These interaction features can include chat rooms, message forums (i.e., bulleting boards), e-mail and other means of exchanging data entered between participants. Chat rooms, message forums, and other participant interaction data exchange mechanisms may be individually associated with a particular segments of the primary curricula 1011–1015. Thus, for example, particular chat rooms or message forums may be devoted to discussion of a topic associated with a particular segment 1011–1015 of the primary curricula data 1010. By associating participant data with particular curricula segments such as easier access to relevant information or other advantages may be obtained.

Figure 11:
FIG. 11 is a chat room access interface.

Marker data 1011–1015 can be used to coordinate access to the chat rooms, messaging forums, and other participant interaction facilities. As primary curricula segments 1011–1015 are presented to a user, the marker data 1016–1020 conveys and is used to display visual indicators (e.g., icons or text having associated hypertext links) at a participant's computer indicating that there a participant interaction features (and corresponding collateral data 1021–1025) is associated with the primary curricula. FIG. 11 shows an example interface in which a streaming video of a classroom lecture is presented as primary curricula in a first area of a browser window 1101. As the primary curricula is presented, the marker data may be used to display chat room access icons 1120. Each of the icons 1120 includes an image derived from a different segment of the primary curricula presentations 1101. Participants can select a chat room by selecting a corresponding icon 1120. For example, to enter a chat room discussion about students questions, a user can select the icon 1121. When the icon 1121 is selected, messages being sent between chat room participants are displayed 1110 at the user's browser. The user can then enter input in field 1130 and select the send button 1131 to add their own input to the chat room messages 1110. Chat room messages 1110 may be exchanged using commercially available chat room messaging software which can include a database and server components executed at a chat room server 142 as well as software components executed at participant's browsers.

In some implementations, participants can enter annotations (a form of collateral data) during presentations of primary curricula. Participant's annotations can be sent as data 1032 to the host 150 and stored in a database 146 by an annotation server 141. To coordinate storage of annotation data, marker data 1016–1020 may be returned to the host 150 to indicate the segment of curricula 1011–1015 that the annotation reference. Alternatively, new marker data created at the client computer and identifying a segment 1011–1015 can be sent to the host (e.g., a time stamp or video frame number). The host 150 may process this data to associate annotations with curricula 1011–1015. Annotations may be displayed during a subsequent review of the primary curricula material. The system can also display an annotation report. An annotation report can include a printed or displayed listing of text annotations with icons designating the primary curricula associated with each of the annotations.

In some implementations, collateral data 1021–1025 also can include on-line tests, quizzes, or other assessment features. For example, a pop-up question box or a quiz can be presented after each segment 1011–1015 to determine a participant's understanding of the segment. Answers to these assessment questions are returned as data 1032 and can be used to assess a participant's understanding of a particular segment of curricula 1016–1020. Scoring of assessment responses can be computer-implemented or may be human-assisted. Based on this assessment scoring, the current primary curricula presentation 1010 can be customized; primary curricula segments can be inserted into the data stream 1010 to improve a participants skills in a particular area, or the presentation of particular curricula segments may be inhibited to prevent unnecessary coverage. Assessment scores can be stored as user profile data and reported to the participant at a later time or used to customize a future curricula presentation.

Components of the software used to implement host 150 can include commercially available software products such as Learning Space™ by Lotus Development Corporation, Oracle™ database products, web server software, and other commercially available software. In addition to network access to course content, implementations may distribute software and/or education modules to student's computer so that the lessons can be accomplished without requiring a connection to a host 150.

Although the exemplary system 150 depicts different servers 131–136 and databases 145–146, if computing power, storage, and capacity permits, these different servers 131–136 and databases 145–145 may be integrated as components or processes executing on a single physical computer system. Similarly, in different implementations, each of these components may be further partitioned and subdivided among multiple different computers and networking hardware and may be geographically distributed. For example, the presentation data server 136 can include multiple processing and database sub-systems, such as cooperative or redundant processing and/or database servers 141–144, that can be geographically dispersed throughout the network 100. Similarly a database, e.g., database 145 may be geographically distributed such in an implementation in which the database 145 includes data distributed over multiple web servers. Data multicasting and other processing and networking hardware and software can also be included in the host system 150 or elsewhere in the network 100.

Computers in an on-line education system may be connected to each other by one or more network interconnection technologies. For example dial-up lines 163, token-ring and/or Ethernet networks 110 and 140, high-speed data lines 164 (e.g., T1 lines or asynchronous transfer mode links), wireless links 161 and integrated service digital network (ISDN) connections 162 may all be combined in the network. The particular network architecture shown in FIG. 1 is exemplary. Other packet network and point-to-point interconnection technologies may also be used.

The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits). A user's data profile can also include both relatively permanently stored data (e.g., on a hard disk or CD-ROM) as well as relatively temporary or transient data (e.g., in a data structure in volatile RAM memory) as well as such data distributed at different network locations.

A number of embodiments of the present invention have been described. Nevertheless, it will be understood that various modifications may be made without departing from the spirit and scope of the invention. For example, client computers 101–106 can comprise a personal computer executing an operating system such as Microsoft WindoWS™, Unix™, or Apple MacOS™, as well as software applications, such as a web browser. Client computers 101–106 can also be terminal devices, a palm-type computer WEB access device that adhere to a point-to-point or network communication protocol such as the Internet protocol. Other examples can include TV WEB browsers, terminals, and wireless access devices (such as a 3-Com Palm VII organizer). A client computer may include a processor, RAM and/or ROM memory, a display capability, an input device and hard disk or other relatively permanent storage.

What is claimed is:

1. In a computer-based learning system, a method of displaying curricula comprising:

receiving at a computer terminal first curricula data comprising a first plurality of presentation segments, the presentation segments each being delimited by marker data;

synchronizing a display of curricula annotation data comprising a second plurality of presentation segments with a display of the first presentation segments based on the marker data; wherein:

the curricula annotation data comprises data previously generated based on input from a student responsive to a presentation of the first curricula data;

each presentation segment comprises motion video data;

the curricula annotation data comprises text; and coordinating a display of the curricula annotation data with a display of presentation segments comprises:

processing presentation segment motion video data and the curricula annotation data to simultaneously display motion video and annotation text; and emphasizing different segments of the displayed annotation text based on a change in information context associated with the displayed motion video.

2. The method of claim 1 wherein emphasizing different segments comprises changing a text display attribute.

3. In a computer-based learning system, a method of displaying curricula comprising:

displaying at a computer terminal curricula data comprising a plurality of motion video segments;

displaying a selection interface comprising a plurality of different images, each image being associated with a different one of the motion video segments;

receiving selection data in response to the displayed selection interface, the selection data identifying a user selection of one of the images; and accessing a participant interaction area associated with the selected image;

wherein each participant interaction area comprises a chat room configured to enable exchange of messages between participants.

4. The method of claim 3 wherein accessing a participant interaction area comprises operatively coupling the computer terminal to a chat room messaging database to enable chat message exchange by a user of the computer terminal.

* * * * *